June 22, 1937.  E. L. MAGNUS  2,084,737
REAMER
Filed July 5, 1935
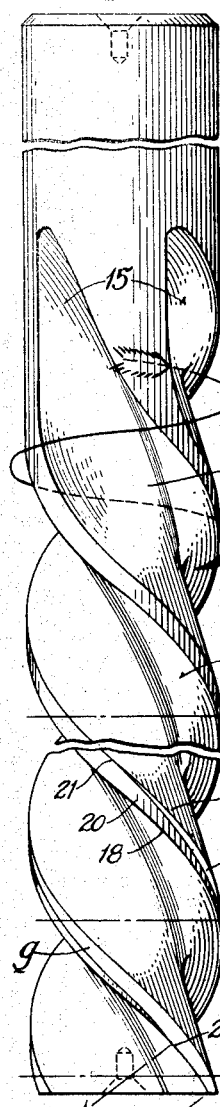
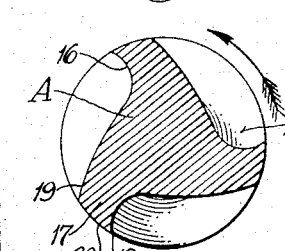
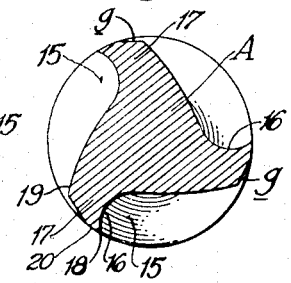
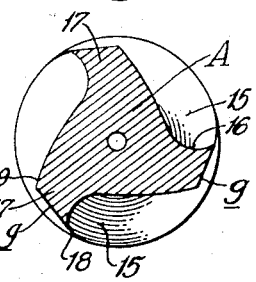
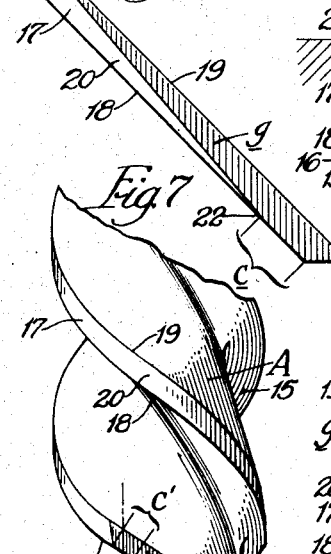
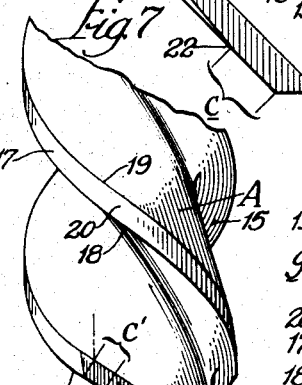
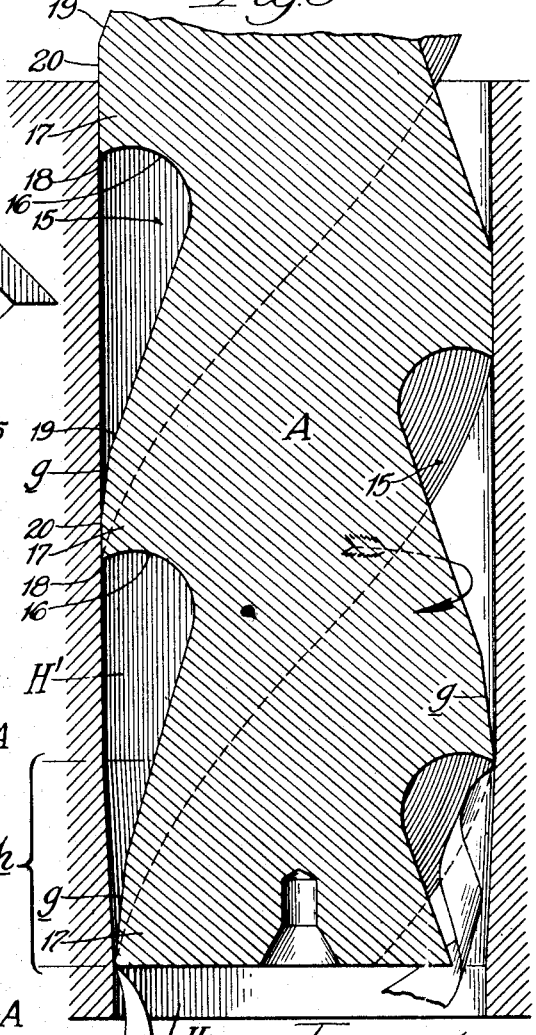
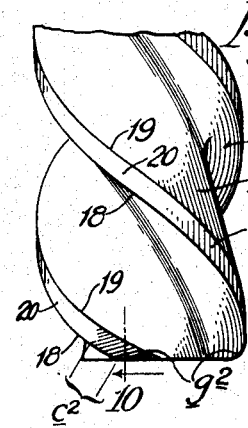
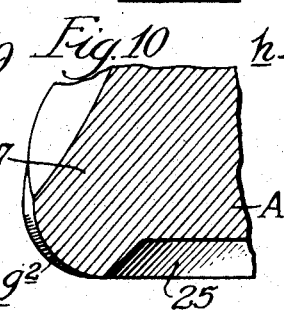
Inventor:
Everett L. Magnus Patented June 22, 1937

2,084,737

UNITED STATES PATENT OFFICE 2,084,737

REAMER

Everett L. Magnus, Chicago, Ill., assignor of two-thirds to William J. Neumann and Paul Richard Konger, both of Chicago, Ill.

Application July 5, 1935, Serial No. 29,832

4 Claims. (Cl. 77—72)

This invention which relates to reamers has to do particularly with the manner in which the helical lands thereof are ground to provide a spiral cutting edge. A fundamental point in connection with the present invention is that the lands are helical in the direction opposite the direction of rotation of the reamer, i. e., if the reamer is to be operated in a right-hand direction, the flutes cut in the body of the reamer will be cut left-handed, and vice versa. Furthermore, the lands will be formed substantially cylindrical end to end, except for a short distance up from the tip end of the reamer where the cutting edge may be formed at a very slight angle.

Reamers formed in the above manner have many decided advantages. In the first place, the lands which are confined within a cylindrical area provide a substantial bearing for the reamer within the hole being reamed, and as a result very accurately formed holes are produced. There is no tendency for the reamer to "whip" about and produce a twisted hole in which the distance from the center of the hole to the side wall thereof will vary at different points, as is common with straight fluted or slightly spiral fluted reamers.

Second, having a large bearing surface provided by the spiral lands, there is no tendency to chatter which causes oversize and distorted holes.

Third, my reamer is less expensive to manufacture. A cylindrical piece of stock is used in which are cut a plurality of spiral flutes providing upstanding lands, the tips of each being very slightly relieved in a manner to provide a cutting edge. By such a simple method of manufacture the cost of producing is reduced to a minimum without impairing its efficiency or accuracy.

Fourth, the reamer is intended for use in a spindle for high speed work, and in such cases it is necessary to introduce a suitable lubricant, such as oil or soap water. By having the lands formed helically in a direction opposite to the direction of rotation it is apparent that the lubricant or cleansing liquid will be forced downwardly to the cutting edge where it is most needed.

Fifth, an important aspect of reaming is keeping the chips away from the cutting edge. By virtue of the spiral lands proceeding opposite to the direction of rotation, all the chips as they are cut from the interior of the hole being reamed are forced downwardly ahead of the reamer tip and out of the way of the next preceding cutting edge. This is an extremely important point as it is a common fault of most reamers that the chips are not disposed of fast enough, with the result that they wedge themselves between the wall of the hole and the lands of the reamer causing it to "freeze" in the hole. This is very damaging to reamers and produces a very rough surface in the work and results in a great loss of reamer life.

Sixth, the reamer is so formed that it can be easily ground to accurate shape, which together with the ability to wipe itself clean as it reams, presents a tool which is not subjected to many unusual stresses or strains. Because of these facts, breakage is reduced to a minimum, the necessity for refacing the cutting edge is reduced, and the reamer is capable of continuous hard reaming at substantially higher speed than has heretofore been possible, and at the same time producing reamed holes of extreme accuracy. It has been found by actual tests that the present reamer may be used from ten to thirty times longer without sharpening than most commercial reamers available at present, and at the same time will produce a reamed hole which is accurate within very small tolerances.

Seventh, an important consideration in reaming is the surface finish produced. It has been proven that the present reamer after many hours of hard use will continue to produce a surface finish comparable with internal grinding.

These, and many other important features will be enlarged upon as the specification proceeds.

As an exemplification of my invention, reference is made to the accompanying drawing, in which—

Figure 1 is a view in elevation of my improved reamer;

Fig. 2 is a sectional view, the same being taken on line 2 of Fig. 1;

Fig. 3 is a similar view taken on line 3 of Fig. 1 and showing the lands partially relieved;

Fig. 4 is a similar view taken on line 4 of Fig. 1 showing the lands fully relieved providing a cutting edge;

Fig. 5 is an enlarged longitudinal sectional view of the tip end of the reamer in cutting position within a hole;

Fig. 6 is a developed view of one of the lands showing that portion which is relieved by grinding;

Fig. 7 is a fragmentary view of a modified form of cutting edge.

Fig. 8 is an enlarged sectional view taken on line 8 of Fig. 7;

Fig. 9 is a fragmentary view of a further modified form of cutting edge; and

Fig. 10 is an enlarged sectional view taken on line 10 of Fig. 9.

Referring more particularly to the form of reamer shown in Figs. 1 to 6 inclusive, the body A comprises a cylindrical bar of suitable material, preferably high speed steel, in which is cut a plurality of spiral flutes 15 which preferably are cut at an angle of approximately 45°. The number of flutes and the angle at which they are cut may vary according to the purpose for which the reamer is to be used. As shown, the flutes may be undercut as at 16, although it is not essential that they be so formed. For example, in working with brass material, drilling or reaming is a process of breaking rather than cutting, in which case the flutes should be cut radial rather than undercut.

The flutes may be evenly spaced leaving therebetween an upstanding land 17 having a forward edge 18, a rearward edge 19, and an outer cylindrical surface 20. In order to provide a cutting edge, the outer surface 20 of each of the lands near the tip end of the reamer are relieved by a grinding process. By preference, such grinding is made at an angle to the axis of the reamer, and starts some distance back from the reamer tip, as at 21, (see Fig. 1) wherein the ground surface $g$ starts breaking the outer cylindrical surface 20 of the land and progressively widens until it intersects the forward edge of the land at 22, thus providing a cutting edge $c$ from the point 22 to the reamer end. It will be apparent that such a cutting edge will be slightly spiral as it follows very closely the forward edge of the spiral land 17.

By reference to Fig. 5, it will be seen that the unreamed portion of the hole H merges into a tapering portion $h$ (shown exaggerated for the purpose of illustration) which is that portion of the hole in which the cutting edge $c$ is operating, and the portion H' is reamed to size.

It is to be understood that because of the particular shape of the spiral cutting edges, a left-hand helix for rotation in a right-hand direction, as shown by the arrow in Fig. 1, it will be necessary to have considerable downward pressure applied on the driving spindle. It is due to this downward pressure that the cutting edge is forced to cut into the material at a uniform rate without "digging in" intermittently, as is true with reamers having a slightly tapered tip.

As above pointed out, it is an important feature of the present invention that the chips which are cut away from the inside of the hole are forced downwardly by the forward edge 17 which is being rotated in a direction opposite to the cut of the flutes. This is a feature which contributes greatly to the success of the present reamer. Up to the present reamers have been designed with straight flutes or slightly helical flutes which do not wipe the chips away fast enough, with the result that they wedge themselves between the cutting edge of the reamer and the wall of the hole scratching the surface thereof, which defeats the very purpose for which the reamer is intended.

The construction shown in Figs. 7 to 10 inclusive are very slight modifications of the form just described. For example, the ground surface $g'$, shown in Figs. 7 and 8, consists of a sharp angular grind on the tip of the land which relieves the same and provides a cutting edge $c'$. This form is particularly adapted for working such materials as brass or bronze.

Figs. 9 and 10 illustrate another modified form which is particularly suitable for "bottom" or "shoulder" reaming and consists of grinding the tip of the land on a small radius $g^2$ which intersects the forward edge 18 to provide a cutting edge $c^2$. If desired, the end of the reamer may be counterbored as at 25, to provide space for chips to accumulate when there is no outlet therefor, as in bottom reaming.

While I have shown and described but a few embodiments of the present invention, it is to be understood that it is capable of many modifications. Changes in the construction, therefore, may be made without departing from the spirit and scope of the present invention, except as contained in the appended claims.

I claim:

1. A reamer comprising a substantially cylindrical body having helically extending flutes cut therein providing therebetween uninterrupted helically extending cylindrical lands which are unrelieved for at least one turn of the helix, the flutes and lands turning in a direction opposite to the direction of rotation for reaming, and the cylindrical wall portion of each land, inwardly of the entering end of the reamer body, being relieved by an angularly ground surface which cuts the rearward edge of the land and merges into the forward edge of the land adjacent the entering end of the reamer, providing downwardly directing helical shearing edge continuations of said cylindrical lands.

2. A reamer comprising a substantially cylindrical body having helically extending flutes cut therein providing therebetween uninterrupted helically extending cylindrical lands which are unrelieved for at least one full turn of the helix, the flutes and lands turning in a direction opposite to the direction of rotation for reaming, and the continuation of each cylindrical land being relieved by an angularly ground surface which cuts the rearward edge of the land and progressively widens toward the entering end of the reamer body, the angularly ground surface of each land merging into the forward edge of the land adjacent the entering end of the body, and being at a constant angle throughout to provide a helical shearing edge.

3. In a reamer having helical lands whose outer surfaces are of substantial width and in a common cylinder for at least one full turn of the helix the lands being parallel with each other and of constant pitch throughout their length in a direction opposite to the direction of rotation for reaming, a continuing cylindrical surface portion of each land being relieved for a portion of a turn of the helix by an angularly ground surface which cuts the rear edge of the land and widens towards the entering end of the reamer body where it intersects the forward edge of the land to provide a helical shearing edge at the tip end of the land, and the helical angle of the lands being such that they will wipe substantially all chips to a point forwardly of the reamer tip.

4. A reamer in which the lands are cylindrical and extend helically and at the same pitch throughout in a direction opposite to the direction of rotation for reaming, a cylindrical surface portion of each land being relieved for a portion of a turn of the helix inwardly from the tip end of the reamer by a ground surface which intersects the forward edge of the land adjacent the tip and merges into the rearward edge of the land, providing adjacent the tip a relatively short shearing edge extension of the cylindrical land.

EVERETT L. MAGNUS.